United States Patent [19]

Bloch

[11] Patent Number: 4,991,345
[45] Date of Patent: Feb. 12, 1991

[54] APPARATUS AND METHOD FOR PLANT CARE

[76] Inventor: Joseph S. Bloch, 276 Greenway Rd., Lido Beach, N.Y. 11561

[21] Appl. No.: 417,887

[22] Filed: Oct. 6, 1989

[51] Int. Cl.[5] .............................................. A01G 9/02
[52] U.S. Cl. ........................................... 47/79; 47/66
[58] Field of Search ...................... 47/42.5, 66, 79, 80, 47/81

[56] References Cited

U.S. PATENT DOCUMENTS

| 2,387,340 | 10/1945 | Moriarty | 47/79 |
| 2,519,166 | 8/1950 | White | 47/79 |
| 3,243,919 | 4/1966 | Carlson | 47/79 |

FOREIGN PATENT DOCUMENTS 352482  7/1931  United Kingdom ................. 47/79

Primary Examiner—Henry E. Raduazo
Assistant Examiner—Jerold D. Johnson
Attorney, Agent, or Firm—Ostrolenk, Faber, Gerb & Soffen

[57] ABSTRACT

A method of caring for plants is carried out by utilizing a planter that includes a soil container having openings at the bottom thereof for communication to a basin. The container is filled with liquid to a level at which substantially all of the soil is submerged in the liquid and remains so for a selected period of time. Then an aperture at the bottom of the basic is opened and the liquid in the container drains through the openings at the bottom of the latter into the basin and exiting therefrom through the aperture. In another embodiment a transparent siphon is utilized to remove liquid from the basin and is also utilized as a sighting means so that a user is aware that liquid in the container has reached a desired level. Salts that often accumulate at the soil surface are run off by having liquid enter the container through the openings at the bottom thereof and run out of the container above the soil line.

9 Claims, 3 Drawing Sheets

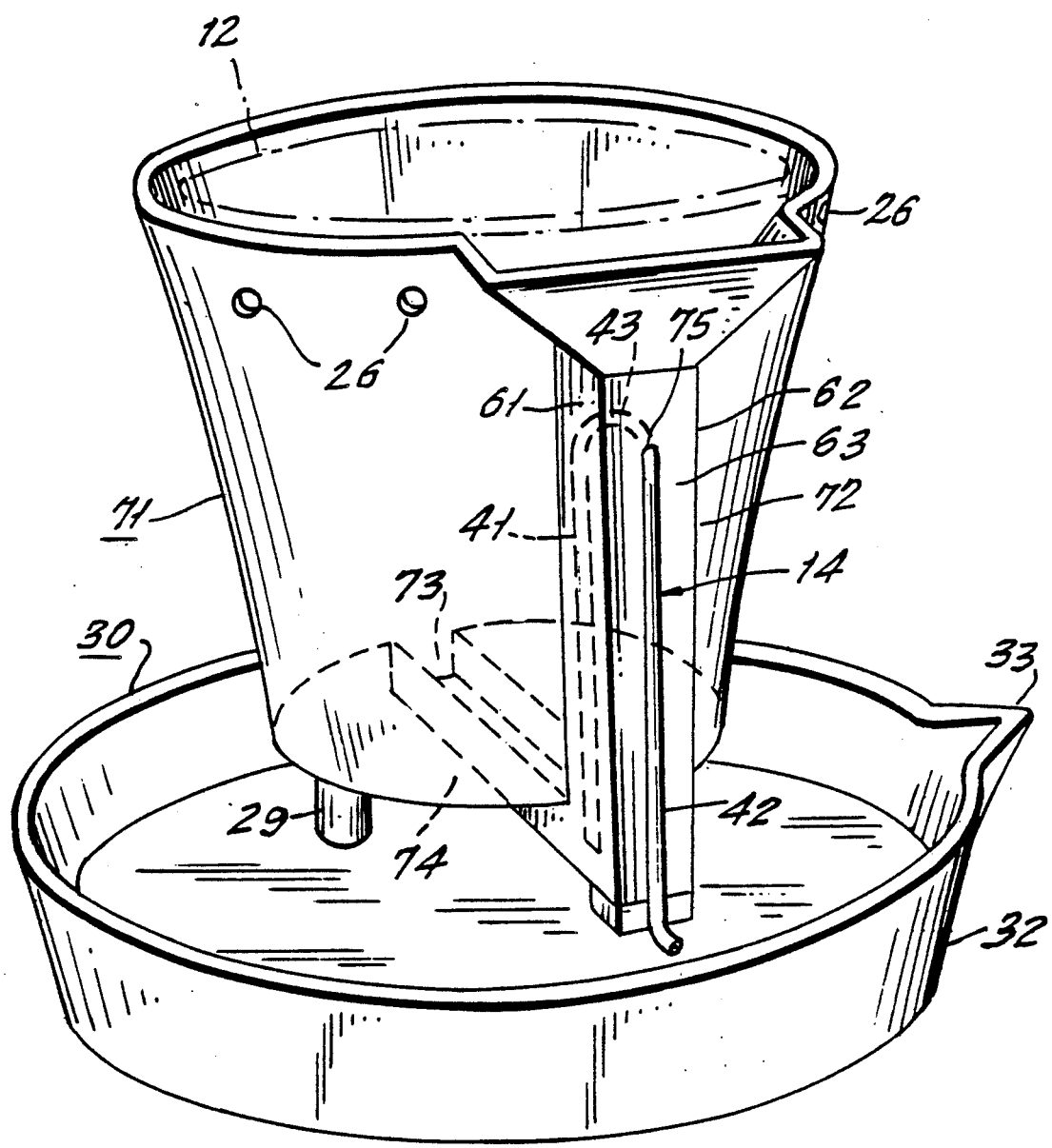

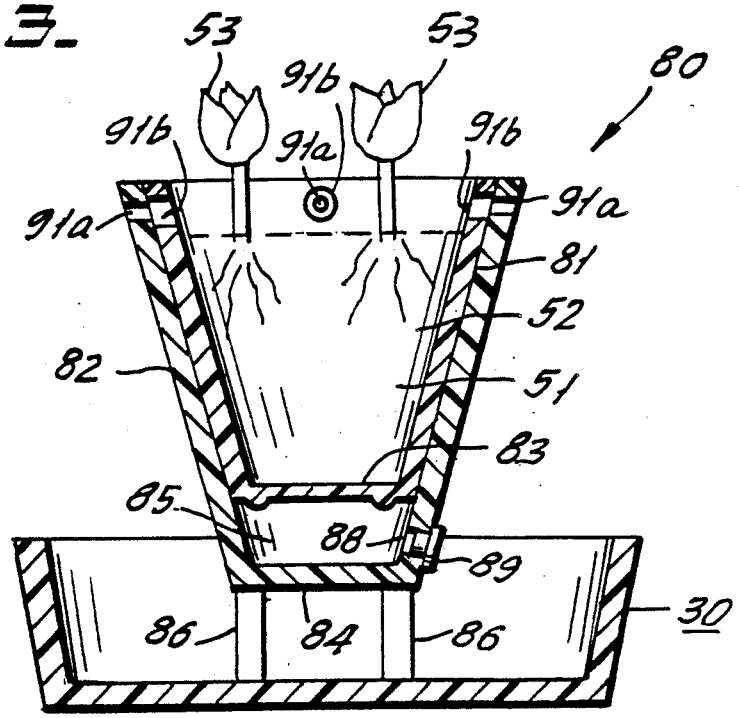
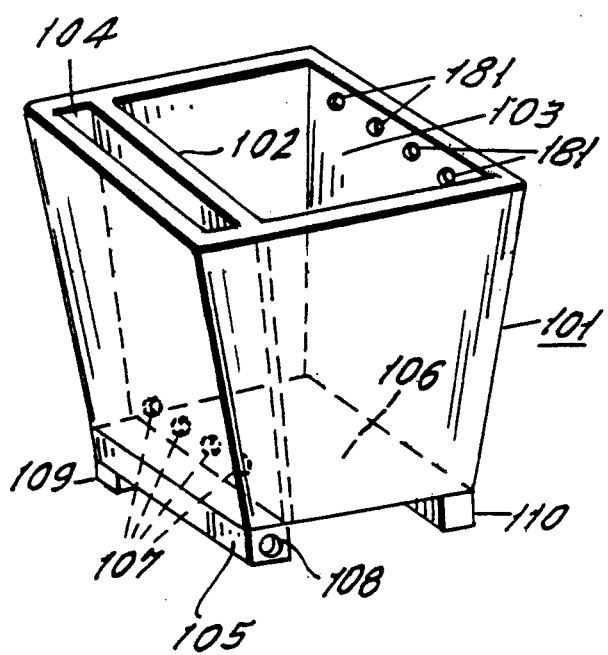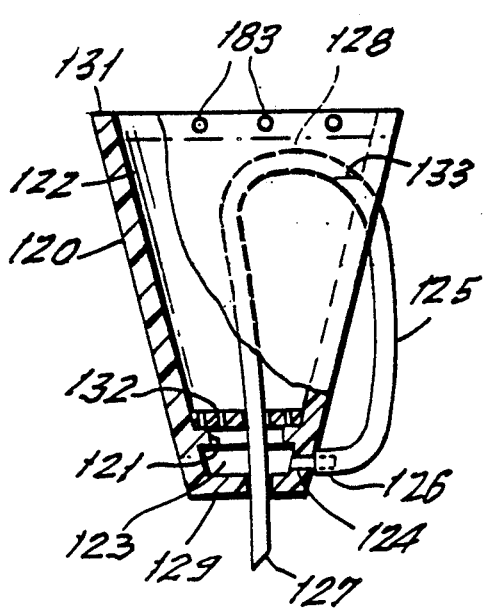

4,991,345

APPARATUS AND METHOD FOR PLANT CARE

BACKGROUND OF THE INVENTION

This invention relates to planters in general and more particularly relates to planter apparatus and a method of plant care which assures that the planting medium is well irrigated without subjecting the plant roots to over irrigation and/or insufficient irrigation.

The instant invention concerns a type of planter in which there is an inner container for soil, an outer container wherein the inner container is disposed, a space constituting a basin between bottom walls of the inner and outer containers and the bottom wall of the inner container being apertured to permit water to drain into the basin from the inner container. Prior art constructions of this type are disclosed in U.S. Pat. No. 4,192,097 issued Mar. 11, 1980 to W. J. Smith for Horticultural Improvements and U.S. Pat. No. 4,335,540 issued June 22, 1982 to R. P. Allen for Combined Plant Container and Watering Device.

A serious problem encountered when utilizing prior art planters of this type is that even though the soil appears to be moist and watering occurs at regular relatively short intervals, because water flows naturally along paths of least resistance (so-called "short circuit effect"), certain portions of the soil are not moistened. That is, each time watering takes place the water takes the same favored paths in draining from top to bottom and these paths "short circuit" or bypass certain areas of the soil. When the prior art has sought to overcome the "short circuit effect" the results have been expensive structures and/or procedures that are cumbersome, and more often than not resulted in overwatering or failed to eliminate sour soil and/or excessive salt buildup so that leaf tips and margins turned yellow or brown, plants rotted at or above soil level, leaves dropped, leaves and/or petals became spotted or completely discolored, leaves curled or otherwise distorted, and/or leaves or stems wilted.

BRIEF DESCRIPTION OF THE INVENTION

To overcome these problems of the prior art, utilizing a double container or pot arrangement, the instant invention provides an irrigating procedure in which the soil in the inner pot is submerged in water for a selected period of time, say between five and fifteen minutes, during which time water also fills the space or basin between the bottom walls of the inner and outer containers and extends well up into the inner container, approximately to the top surface of the soil. After the five to fifteen minute interval, more water is added until all of the soil is below water. Thereafter, water is drained from the basin while water drains from the inner container through the perforated bottom thereof. In a preferred embodiment of the instant invention the water level for the inner container is monitored and a siphon is utilized to drain water from the basin at a controlled rate so that most of the water is permitted to drain from the inner container and the plant roots are buried in damp soil rather than in soil that is submerged in water.

In accordance with the instant invention, water can be forced upward through the perforated bottom of the inner container to drain from the inner container over the top edge thereof or through one or more side apertures that are located slightly above the soil level. For the embodiment in which a siphon is utilized to drain water from the basin, the normal outlet end of the siphon hose is raised above the upper soil level during the upper desalting procedure. After this procedure takes place the siphon outlet is directed downward once again and water is evacuated from the basin below the inner container.

Accordingly, the primary object of the instant invention is to provide a reliable irrigating method consisting of simple procedures.

Another object is to provide simplified equipment for carrying out the irrigating method taught by the instant invention.

Still another object is to provide equipment of this type that is simple to operate.

A further object is to provide relatively inexpensive planter apparatus which permits simplified plant care.

BRIEF DESCRIPTION OF THE DRAWINGS

These objects as well as other objects of this invention shall become readily apparent after reading the following description of the accompanying drawings in which:

FIG. 2 is a perspective of a modified form of the outer container which comprises a portion of the apparatus illustrated in FIG. 1.

FIG. 3 is a vertical section taken through the center of simplified apparatus for carrying out major portions of the irrigating method according to teachings of the instant invention.

FIG. 4 is a perspective looking at the top and two corners of another simplified apparatus for carrying out major portions of the irrigating method according to teachings of the instant invention.

FIG. 5 is a side elevation of still another simplified version for carrying out major portions of the irrigating method according to teachings of the instant invention.

DETAILED DESCRIPTION OF THE INVENTION

Figure 1:
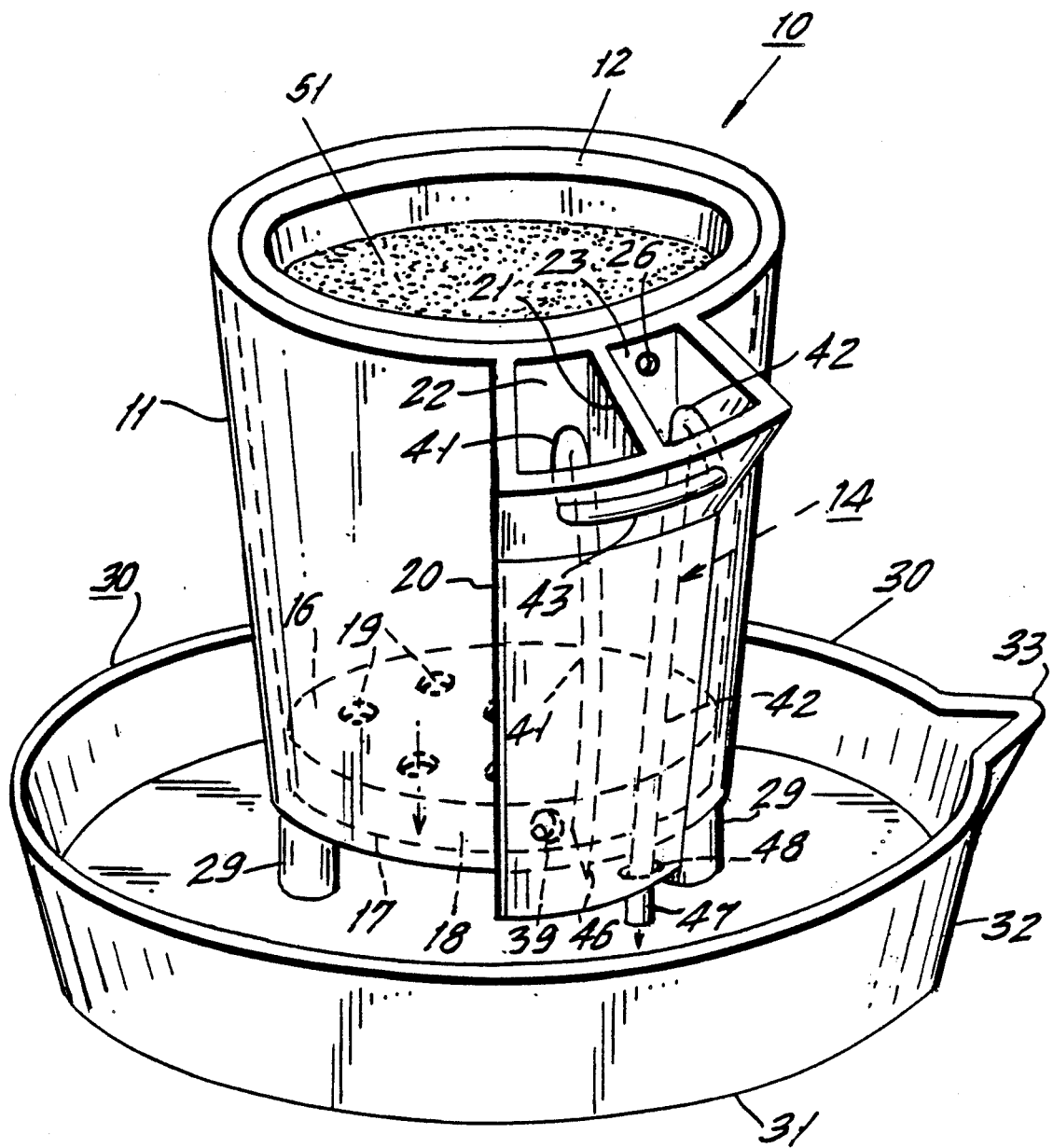
FIG. 1 is a perspective of planter apparatus constructed in accordance with teachings of the instant invention.

Now referring to the Figures and more particularly to FIG. 1 which illustrates planter apparatus 10 that includes outer container 11, inner container 12 disposed within outer container 11 and a draining means in the form of siphon tube 14. The sidewalls of both containers 11 and 12 are circular and slightly tapered. As will hereinafter be seen, while a relatively tight fit between the outer wall of inner container 12 and the inner wall of outer container 11 will reduce the amount of liquid to be drained, such relatively tight fit is not required in order to carry out the instant invention. Containers 11, 12 are proportioned so that the perforated bottom wall 16 of inner container 12 is spaced from bottom wall 17 of outer container 11 to form upper and lower boundaries of catch basin 18 which receives liquid that drains from inner container 12 through apertures 19 in bottom wall 16 thereof. Cleaning of basin 18 is facilitated by removing inner container 12 from outer container 11.

Formed integrally with outer container 11, extending the full height thereof and disposed on the outside thereof, is spout 20 having internal central wall 21 that divides spout 20 into side-by-side vertical channels 22, 23. The lower end of channel 22 is in communication with basin 18 by means of aperture 39 and, for a reason to be hereinafter explained, near its upper end channel 23 is provided with drain aperture 26 that is aligned with an aperture of similar size in the sidewall of inner container 12, which aperture 26 is disposed slightly above the upper level of the soil in inner container 12. Legs or standoffs 29 project downwardly from bottom wall 17 of outer container 11 and rest against the bottom wall 31 of pan 30 so as to maintain a space between bottom 17 of outer container 11 and the inside surface of bottom wall 31 for pan 30. Sidewall 32 of pan 30 is provided with spout 33 which makes it convenient to pour liquid from pan 30.

Siphon tube 14 includes inlet portion 41 that is disposed vertically within channel 22, outlet portion 42 that is disposed vertically within channel 23 and curved sighting portion 43 that connects the upper ends of tube portions 41 and 42. Sighting portion 43 is disposed outside of spout 20 and is positioned slightly below drain aperture 26. The free or lower end 46 of inlet portion 41 is disposed at the bottom of channel 22 and constitutes the inlet for siphon 14, while the free bottom end 47 of outlet portion 42 constitutes the outlet 47 for siphon 42, which outlet 47 is disposed below spout 20 in that the lower end of outlet portion 42 extends through oversized aperture 48 at the bottom of channel 23. Thus, liquid discharges from tube 14 directly into pan 30. Liquid that accumulates in pan 30 may be discarded or may be poured into inner container 12 during a subsequent watering operation. As an alternative to accumulating liquid in pan 30 tube 14 may be directed to discharge directly into a drain. By having a substantial portion 43 of tube 14 disposed outside of spout 20 removal and replacement of tube is facilitated.

To utilize planter apparatus 10 inner container 12 is filled with soil or other planting medium 51 (FIG. 3) wherein roots 52 of plant 53 are buried. The height of soil 51 is slightly below the upper edge of outer container 11, and for a reason to be hereinafter explained, curved section 43 of siphon tube 42 extends slightly above the soil level. The number and size of the perforations 19 are sufficient to permit water or other plant nourishing liquid to drain relatively freely into basin 18 from the interior of inner container 12, yet wall 16 is strong enough to support soil 51 even when it is saturated.

The irrigating operation is commenced with siphon hose 42 in the position of FIG. 1. Water, either plain or fortified with nutrients, is poured into channel 22 through the enlarged top thereof and/or into the open upper end of inner container 12 until soil 51 within container 12 is soaked with water as indicated by the level of water in channel 22 and inlet portion 41 of siphon tube 14. The latter is transparent, at least in the vicinity of its curved portion 43. When water reaches a desired height within inlet portion 41, this height being somewhat below curved portion 43, the addition of water is halted for a predetermined interval, typically five to fifteen minutes. During this period the water distributes itself so that basin 18 is filled and most of the soil 51, starting upward from the bottom 16 of inner container 12, is immersed in water. This condition will be indicated by a slight drop in the water level sighted in siphon tube inlet portion 41, which level will stabilize. Thereafter, more water is added slowly through the top of channel 22 or at the upper end of inner container 12. This causes the level of water within inlet portion 41 to rise, finally reaching a level in curved portion 43 where siphoning action commences and water flows from exit 47 into pan 30 at a rate which is controlled largely by the diameter of siphon tube 14. This flow continues until essentially all of the water is evacuated from catch basin 18. If water is permitted to remain standing within pan 30 air in the vicinity of planter apparatus 10 will remain moist. Water collected in pan 30 may be poured into other planters or may be discarded as desired.

To wash salts from the upper portion of soil 51, tube outlet portion 42 is removed from channel 23 and extended upward so that outlet 47 is substantially above inner container 12. Thereafter water is introduced into channel 22 through its upper end with this water flows upward through perforations 19 and upward through soil 51 and exiting inner container 12 through an aperture that is aligned with aperture 26, flowing downward, exiting channel 23 through aperture 48 at the bottom thereof and entering pan 30.

Outer container 11 with spout 20 thereon may be replaced by outer container 71 of FIG. 2 which includes vertical channel-like protrusion or spout 72 extending for the full height thereof. Basin 73, of rectangular cross-section, extends diametrically across bottom 74 of outer container 71 and projects therebelow. The upper or interior surface of bottom wall 74 slopes gradually from the periphery thereof toward basin 73.

Spout 72 is intended to replace channel 22. Inlet portion 41 of siphon 14 is intended to extend through spout 72 and outlet portion 42 is to be disposed outside of spout 72 with connecting hose portion 43 extending through side aperture 75 with only slight clearance. The latter is located in wall 63 of spout 72 near the upper end thereof. Outer container 71 near the upper edge thereof is provided with a plurality of drain holes 26. It is intended that when inner container 12 is inserted in outer container 71 upper drain holes 26 will be aligned with upper drain holes (not shown) in inner container 12 and that none of these upper drain holes will be aligned with spout 72 so that water which discharges through upper holes 26 flows along the outside of outer container 71 into pan 30. Outer container 71 provides three sidewalls 61, 62, 63 which define spout 72. The fourth sidewall or closure for spout 72 is provided by the curved sidewall of inner container 12 and this sidewall is closely fitted to the inner surface of the sidewall for outer container 71. The aligned upper drain holes in containers 12 and 71 near the tops thereof is utilized for a salts washing operation of the type described for the emobodiments of FIG. 1, with draining salts completely bypassing spout 72.

The apparatus illustrated in FIGS. 1 and 2 may be modified by eliminating siphon tube 14 and using other means for gauging the height of water within inner container 12. For container 71 of FIG. 2 spout 72 may be constructed either in whole or part of transparent material so that the height of water within inner container 12 can be gauged by observing the height of water within spout 72. With such an arrangement a pluggable or valve controlled drain hole will be provided at the bottom of spout 72 for draining water from inner container 12 and from catch basin 73.

FIG. 3 illustrates a simplified version of apparatus for carrying out the plant irrigating method according to the instant invention. That is, planter apparatus 80 of FIG. 3 includes inner container 81 disposed within outer container 82, with the perforated bottom wall of container 81 being spaced from bottom wall 84 of container 82 to form catch basin 85 therebetween. Outer container 82 is disposed within pan 30 at the center thereof being supported on spacing means comprising a plurality of legs 86. Opening 88 in the sidewall of outer container 83 at the bottom thereof provides a passage for draining water from catch basin 85 into pan 30. Normally, opening 88 is closed by removable plug 89 which is removed when water is to be drained from basin 85 and also when reverse flushing is to take place. That is, plug 89 may be removed and a hose (not shown) connected at opening 88 so that water may be introduced into basin 85 and forced upward through soil in and then out of aligned upper side openings 91a, 91b, of the respective outer and inner containers 82, 81 to urge salts from the upper portion of soil 51. Such hose may be transparent and be used for sighting (gauging) of the water level in container 81. Another alternativve is to replace plug 89 by a valve (not shown).

For the embodiment of FIG. 3 with plug 89 in place filling of outer container 81 takes place through the top thereof and should proceed slowly enough to permit water to drain into basin 85 without an excessive amount of water rising above the top of soil 51. This filling operation should be halted when water flows through top openings 91 as fast as it is being supplied to inner container 81.

In the embodiment of FIG. 4 rectangular container 101 is divided by vertical partition 102 into relatively large soil containing chamber 103 and relatively narrow water level sighting chamber 104. Water catch basin 105 extends from and communicates with the bottom of chamber 104, and is below bottom 106 of chamber 103. Apertures 107 near the bottom of partition 102 permit liquid to drain from chamber 103 into basin 105. Other regions of partition 102 may be provided with additional apertures to facilitate draining into chamber 104 and to permit root aeration. Removable drain plug 108 is provided at one end of basin 105 near the bottom thereof. Extension 110 projects downward from bottom 106 of container 101 along the edge thereof remote from basin 105. The end of basin 105 remote from plug 108 is provided with short leg 109 and the bottom of basin 105 slopes so that with extension 110 and leg 109 resting on a horizontal support surface water in basin 105 drains toward plug 108. Apertures 181 near the upper end of chamber 103 are provided for back flushing.

In the embodiment of FIG. 5 container 120 is provided with internal ledge 121 near the bottom thereof which supports perforated partition 132 horizontally to divide container 120 into a relatively deep soil containing section 122 and a relatively shallow basin 123 disposed below section 122. Input end 126 of siphon tube 125 is connected to basin 123 at aperture 124 and outlet end 127 of tube 125 extends below bottom 129 of basin 123. Tube 125 is bent at its midregion 128 which is positioned near but below upper edge 131 of container 120. Mark 133 on the entrance side of midregion 128 is near the upper level of soil within section 122 and is used for sighting the height of liquid in container 120. Apertures 183 near the upper edge of container 120 are provided for back flushing.

It should now be apparent to those skilled in the art that the containers and pans herein described may be molded plastic elements and that formations at the bottom and/or side of an outer container may be formed integrally therewith. Further, a spout and/or siphon tube may be constructed of transparent material and then be used for sighting (gauging) of water level in the inner container. Indicia to indicate operating levels may be marked on the gauging elements required.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. Planter apparatus including:
    a first container for holding a planting medium, said first container having perforations at its bottom;
    a basin disposed below said perforations to catch plant nourishing liquid that drains from said first container through the perforations thereof;
    and selectably operable drain means through which liquid is withdrawn from said basin to a level that is substantially below the perforations; said drain means including a siphon tube having a bend intermediate an inlet and an outlet, which bend is normally disposed above both said inlet and said outlet at an elevation approximately that of planting medium disposed within said first container; said inlet being in communication with said basin and being substantially below the perforated bottom of the first container; said outlet normally being disposed outside of said first container and below said inlet.

2. Planter apparatus as set forth in claim 1 in which the perforations extend through the bottom of said first container.

3. Planter apparatus as set forth in claim 1 also including means defining a space which extends from said basin upward to approximately the height of a planting medium that is disposed within said first container.

4. Planter apparatus as set forth in claim 3 in which the means defining the space is constituted by a vertical channel outside of said first container, with at least a major portion of the means defining the space being formed integrally with a second container having said first container disposed therein.

5. Planter apparatus as set forth in claim 1 also including a pan disposed to receive liquid that discharges from said basin through said drain means.

6. Planter apparatus as set forth in claim 1 also including a vertical channel disposed outside of said first container and having a lower end that communicates with said basin near its bottom, and said inlet being disposed at said lower end;
    said siphon tube also including an inlet portion between said inlet and said bend, which inlet portion extends vertically in said channel.

7. Planter apparatus as set forth in claim 6 including another channel;
    said siphon tube also including an outlet portion between said outlet and said bend, which outlet portion normally extends vertically in said another channel.

8. Planter apparatus as set forth in claim 7 in which the first container near its upper end is provided with overflow aperture means through which liquid drains directly from said first container into said another channel through the top thereof.

9. Planter apparatus as set forth in claim 1 in which said siphon tube is transparent, at least on the vicinity of said bend, to permit gauging the extent of liquid that fills said basin and occupies said first container for most of its height.

* * * * *